US012386518B2

(12) United States Patent
Basu et al.

(10) Patent No.: US 12,386,518 B2
(45) Date of Patent: Aug. 12, 2025

(54) WRITE BOOSTER PINNING

(71) Applicant: Micron Technology, Inc., Boise, ID (US)

(72) Inventors: Reshmi Basu, Boise, ID (US); Jonathan S. Parry, Boise, ID (US); Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 219 days.

(21) Appl. No.: 17/929,962

(22) Filed: Sep. 6, 2022

(65) Prior Publication Data

US 2024/0078020 A1    Mar. 7, 2024

(51) Int. Cl.
*G06F 3/06* (2006.01)
(52) U.S. Cl.
CPC .......... *G06F 3/0619* (2013.01); *G06F 3/0652* (2013.01); *G06F 3/0659* (2013.01); *G06F 3/0688* (2013.01)
(58) Field of Classification Search
CPC .... G06F 3/0619; G06F 3/0652; G06F 3/0659; G06F 3/0688
See application file for complete search history.

(56) References Cited

U.S. PATENT DOCUMENTS

| | | | | |
|---|---|---|---|---|
| 2020/0285407 | A1* | 9/2020 | Lee | ........................ G06F 3/0634 |
| 2021/0011842 | A1* | 1/2021 | Lee | ........................ G06F 12/0246 |
| 2021/0034297 | A1* | 2/2021 | Park | ........................ G06F 3/0656 |
| 2022/0253239 | A1* | 8/2022 | Jang | ........................ G06F 3/0679 |

* cited by examiner

*Primary Examiner* — Eric Cardwell
(74) *Attorney, Agent, or Firm* — Holland & Hart LLP

(57) ABSTRACT

Methods, systems, and devices for write booster pinning are described. In some examples, a memory device may receive one or more commands (e.g., write commands) while operating in a first mode (e.g., a write booster mode). Some write commands may include an indication to pin the data to one or more SLCs. For example, a first write command may be associated with first data and a first indicator and a second write command may be associated with second data. Both the first data and the second data may be written to one or more SLCs. When maintenance operations are performed on the SLCs, the second data may be moved (e.g., written) to one or more MLCs. Additionally or alternatively, the memory system may receive one or more commands to unpin data (e.g., the first data) such that it may be moved to one or more MLCs during subsequent maintenance operations.

15 Claims, 10 Drawing Sheets

WRITE BOOSTER PINNING

FIELD OF TECHNOLOGY

The following relates to one or more systems for memory, including write booster pinning.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
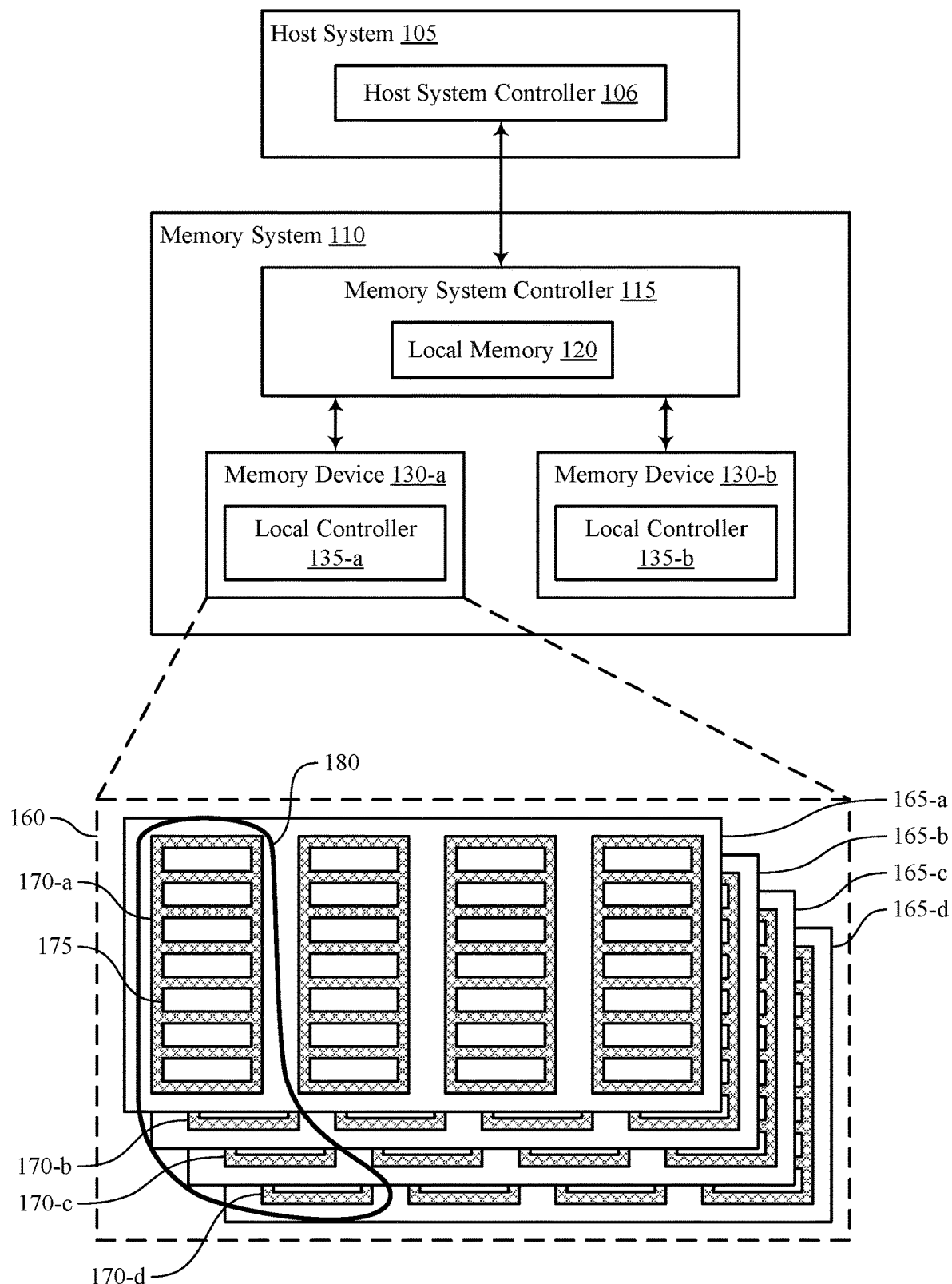
FIG. 1 illustrates an example of a system that supports write booster pinning in accordance with examples as disclosed herein.

In some memory devices, memory cells may be configured to store either a single bit of data or multiple bits of data. Memory cells configured to store a single bit of data may be referred to as single-bit memory cells (e.g., single-level cells (SLCs)) and memory cells configured to store two or more bits of data may be referred to as multi-bit memory cells (e.g., multi-level cells (MLCs), tri-level cells (TLCs) or quad-level cells (QLCs)). Although in some cases an MLC may refer to a memory cell storing two bits of data, MLC is intended to refer herein to any multi-bit memory cell. In some cases, because writing data to SLCs may be faster than writing data to MLCs, data may be written to SLCs as part of an operation (e.g., a write booster operation) to improve the memory device's overall throughput. In some cases, a memory device may include memory cells having a single memory cell structure, each of which may be used as either an SLC or MLC, depending on factors such as a desired access speed or read margin.

Data stored to the SLCs may be periodically moved (e.g., flushed) to one or more MLCs to free up the quantity of available SLCs. However, in some instances, data may be moved from a SLC to a MLC and subsequently accessed, which may undesirably increase the latency of the access operation. Accordingly, it may be desirable to improve performance for memory devices using SLC and MLC cells when accessing the associated data.

A memory system that supports the pinning and unpinning of data stored to one or more SLCs is described herein. The memory device may include an array of memory cells that is divided up in to first portion used as SLCs (e.g., SLC cache) and a second portion used as MLCs. During certain operations initiated by a host system (e.g., during a write booster operation), data may be written to one or more SLCs. In some instances, some data written by the host system may include an indicator to maintain the data (e.g., pin the data) in the SLCs until a subsequent command is received. For example, the memory system may be operating in a write booster mode and the host system may transmit a first write command that includes first data and a first indicator and a second write command that includes second data. The first indicator may indicate to pin the first data to the SLCs. Because the memory system is operating in the write booster mode, the first data and the second data may each be written to one or more SLCs.

Because the first write command also included the first indicator to pin the first data to the SLCs (e.g., to the SLC cache), the first data may be maintained in the SLC cache relatively longer than the second data. For example, during a subsequent maintenance operation, data stored to the SLCs that is not pinned to the SLCs (e.g., unpinned data) may be written to one or more MLCs and erased from the SLCs. That is, after performing one or more maintenance operations, the pinned data may be maintained in the SLCs and the unpinned data may be moved (e.g., written) to one or more MLCs. In some instances, the data may be pinned based on one or more characteristics of the data (e.g., the data being temporary data) or of the memory system (e.g., based on a quantity of available SLCs), data that is frequently accessed by the host system, or both. Accordingly, maintaining such the data in the SLCs may improve the memory system's overall performance.

The memory system may also receive commands that include respective indicators to unpin pinned data. For example, the memory system may receive a command that includes a second indicator to unpin the first data. Accordingly, during a subsequent maintenance operation, the first data may be moved (e.g., written) to one or more MLCs, which may increase the quantity of available SLCs (e.g., the quantity of memory cells designated as SLCs) for subsequent write operations. In some instances, data may be unpinned based on it being less-frequently-accessed by the host system or based on one or more characteristics of the memory system (e.g., based on a quantity of available SLCs). Accordingly, by pinning and unpinning data as described herein, the memory system may improve performance associated with frequently accessed data while maximizing a quantity of available SLCs for subsequent write operations.

Figure 2:
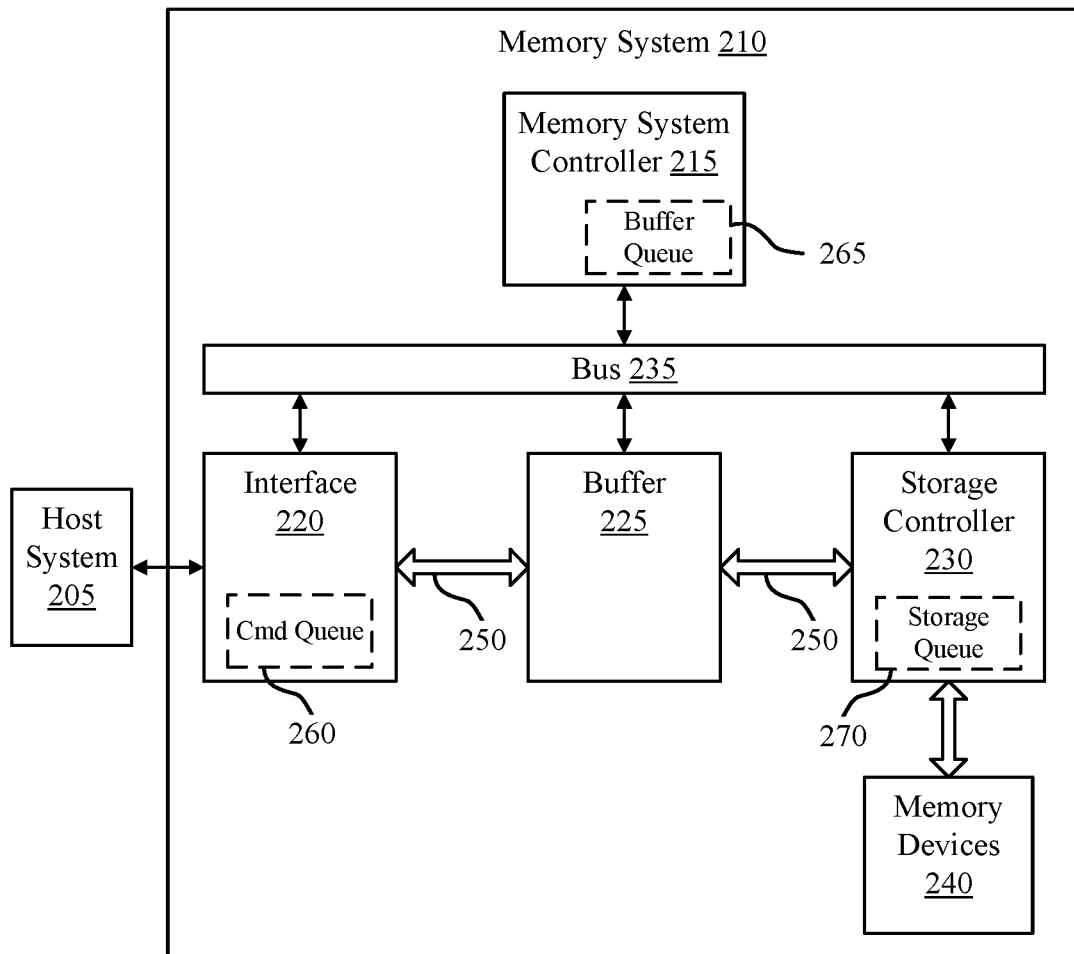
FIG. 2 illustrates an example of a system that supports write booster pinning in accordance with examples as disclosed herein.

Features of the disclosure are initially described in the context of systems with reference to FIGS. 1 through 2. Features of the disclosure are described in the context of a system and process flow diagrams with reference to FIGS. 3 through 5. These and other features of the disclosure are further illustrated by and described in the context of block diagrams and flow charts that relate to write booster pinning with reference to FIGS. 7 through 10.

FIG. 1 illustrates an example of a system 100 that supports write booster pinning in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support write booster pinning. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may be configured to operate in a first mode (e.g., a write booster mode) based on signaling received from the host system 105. As described herein, a write booster mode may refer to a mode where data associated with a write command received from the host system 105 is written to one or more SLCs to improve the performance of the memory system 110. Accordingly, for exemplary purposes, the memory device 130-*a* may include a dedicated die 160, plane 165, or block 170 of memory cells to be operated as SLCs (e.g., the memory device 130-*a* may include at least one cache of SLCs) for a write booster mode.

When operating in a write booster mode, the memory system controller 115 may receive one or more commands (e.g., write commands) from the host system 105. The commands may include respective data and, in some instances, may include an indicator to maintain (e.g., pin) the associated data to the SLC cache of the memory device 130-*a*. For example, the memory system controller 115 may receive a first write command associated with first data and a first indicator and a second write command associated with second data. The memory system controller 115 may write the first data and the second data to a portion of the SLC cache (e.g., to one or more blocks 170 of the SLC cache). The memory system controller 115 may also store the first indicator (e.g., to the local memory 120, to the SLC cache, to the L2P table, or another portion of the memory system 110). By storing the indicator, the first data may be maintained in the SLCs when a maintenance operation is performed on the SLC cache, whereas the second data may be moved (e.g., written) to one or more MLCs of the memory device 130-a due to the second data not being pinned. In some instances, the data may be pinned based on one or more characteristics of the data (e.g., the data being temporary data) or of the memory system (e.g., based on a quantity of available SLCs), data that is frequently accessed by the host system 105, or both. Accordingly, maintaining such the data in the SLCs may improve the overall performance of the memory system 110 due to the data being stored in one or more SLCs.

Additionally or alternatively, pinned data may be subsequently unpinned from the SLC cache. The memory system 110 may receive a command from the host system 105 to unpin pinned data such that, when a maintenance operation is performed on the SLC cache, data that was previously pinned (but now unpinned) may be moved to one or more MLCs of the memory device 130-a. In some instances, data may be unpinned based on it being less-frequently-accessed by the host system 105 or based on one or more characteristics of the memory system 110 (e.g., based on a quantity of available SLCs in the SLC cache). Accordingly, by pinning and unpinning data as described herein, the memory system 110 may improve performance associated with frequently accessed data while maximizing a quantity of available SLCs for subsequent write operations.

FIG. 2 illustrates an example of a system 200 that supports write booster pinning in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMNIC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, the memory system 210 may be configured to operate in a first mode (e.g., a write booster mode) based on signaling received from the host system 205. As described herein, a write booster mode may refer to a mode where data associated with a write command received from the host system 205 is written to one or more SLCs to improve the performance of the memory system 210. Accordingly, for exemplary purposes, the memory device 240 may include a dedicated die, plane, or block of memory cells to be operated as SLCs (e.g., the memory device 240 may include at least one cache of SLCs) for a write booster mode.

When operating in a write booster mode, the memory system controller 215 may receive one or more commands (e.g., write commands) from the host system 205. The commands may include respective data and, in some instances, may include an indicator to maintain (e.g., pin) the associated data to the SLC cache of the memory device 240. For example, the memory system controller 215 may receive a first write command associated with first data and a first indicator and a second write command associated with second data. The memory system controller 215 may write the first data and the second data to a portion of the SLC cache (e.g., to one or more blocks of the SLC cache). The memory system controller 215 may also store the first indicator to a portion of the memory system 210. By storing the indicator, the first data may be maintained in the SLCs when a maintenance operation is performed on the SLC cache, whereas the second data may be moved (e.g., written) to one or more MLCs of the memory device 240 due to the second data not being pinned. In some instances, the data may be pinned based on one or more characteristics of the data (e.g., the data being temporary data) or of the memory system (e.g., based on a quantity of available SLCs), data that is frequently accessed by the host system 205, or both. Accordingly, maintaining such the data in the SLCs may improve the overall performance of the memory system 210 due to the data being stored in one or more SLCs.

Additionally or alternatively, pinned data may be subsequently unpinned from the SLC cache. The memory system 210 may receive a command from the host system 205 to unpin pinned data such that, when a maintenance operation is performed on the SLC cache, data that was previously pinned (but now unpinned) may be moved to one or more MLCs of the memory device 240. In some instances, data may be unpinned based on it being less-frequently-accessed by the host system 205 or based on one or more characteristics of the memory system 210 (e.g., based on a quantity of available SLCs in the SLC cache). Accordingly, by pinning and unpinning data as described herein, the memory system 210 may improve performance associated with frequently accessed data while maximizing a quantity of available SLCs for subsequent write operations.

Figure 3:
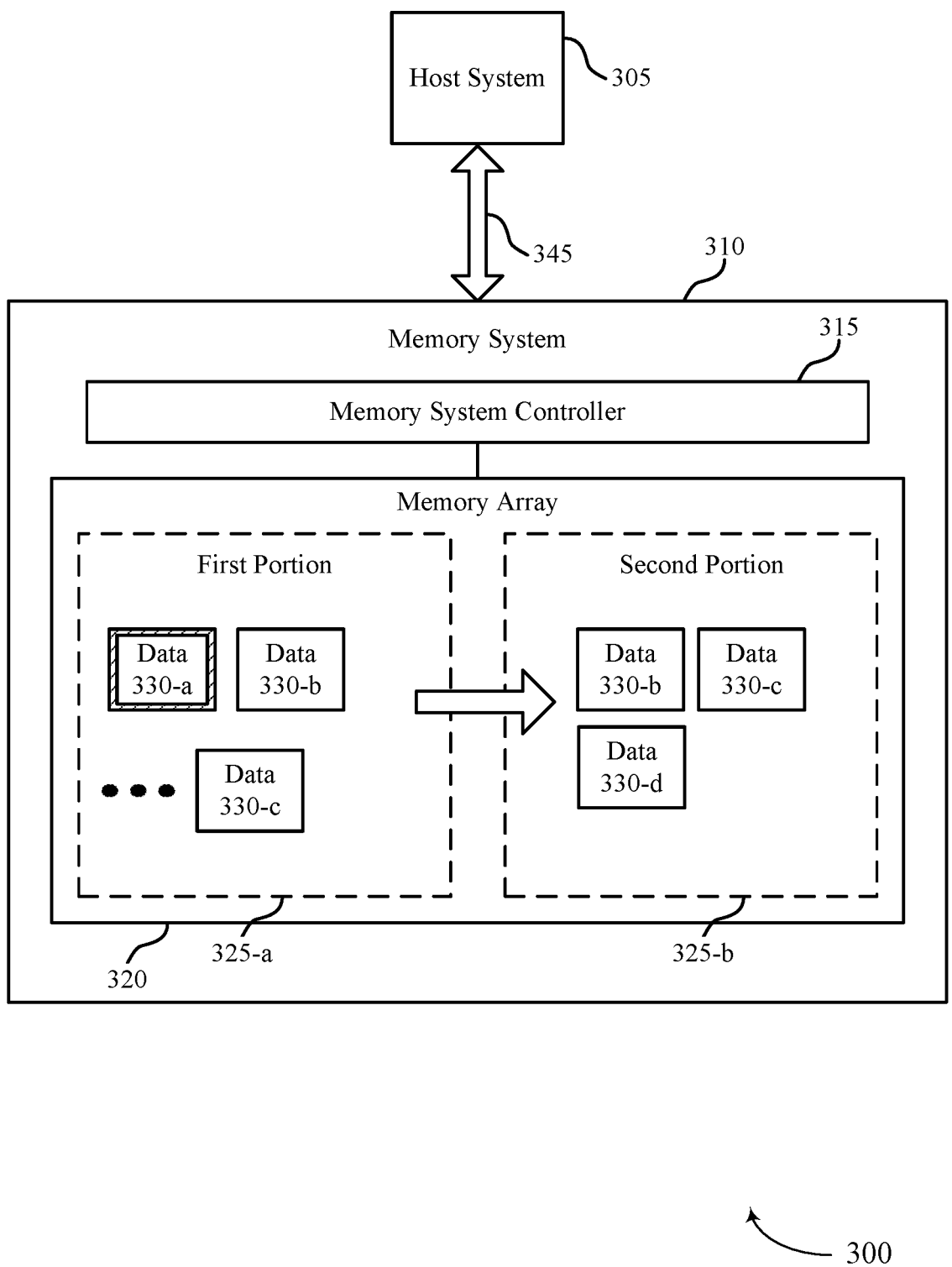
FIG. 3 illustrates an example of a system that supports write booster pinning in accordance with examples as disclosed herein.

FIG. 3 illustrates an example of a system 300 that supports write booster pinning in accordance with examples as disclosed herein. The system 300 may be an example of the system 200 as described with reference to FIG. 2 and may include a host system 305 and a memory system 310. In some examples, the host system 305 may be coupled with the memory system 310 via an interface 345. The memory system 310 may include a memory array 320 that includes a plurality of memory cells. For example, the memory array 320 may include at least a first portion 325-a of memory cells and a second portion 325-b of memory cells. Each of the first portion 325-a and the second portion 325-b may include one or more memory blocks (e.g., one or more blocks of memory cells) configured to store data. For exemplary purposes only, the first portion 325-*a*, the second portion 325-*b*, or both may store data 330. As used herein, data 330 may refer to a block of data 330, although the data 330 may be larger or smaller than a block of data 330.

Each memory block described herein may include one or more memory cells, and the memory cells of different memory blocks may be operated as different types of memory cells. For exemplary purposes only, the memory cells of the memory blocks included in the first portion 325-*a* of the memory array 320 may be operated as SLCs and the memory cells of the memory blocks included in the second portion 325-*b* of the memory array 320 may be operated as MLCs. The system 300 may support pinning data 330 to (and unpinning data 330 from) the first portion 325-*a* of the memory array 320. For example, the data 330 may be pinned or unpinned based on signaling received from the host system 305. By pinning and unpinning data 330 as described herein, the memory system 310 may improve performance associated with frequently accessed data 330 while maximizing a quantity of available SLCs for subsequent write operations.

The memory system controller 315 may perform various operations associated with the memory system 310. For example, the memory system controller 315 may receive commands (e.g., read commands, write commands, unpin commands), read data 330 from and write data 330 to various blocks of the memory array 320, monitor a quantity of access operations performed on the first portion 325-*a* of the memory array 320, monitor a quantity of available memory cells included in the first portion 325-*a* of the memory array 320, store indications of pinned data 330 to the memory system 310, and initiate maintenance operations on the memory array 320, among other operations. In some examples, the memory system controller 315 may be coupled (e.g., coupled indirectly) with the memory array 320 and may be configured to write data 330 to one or more blocks of the first portion 325-*a* and the second portion 325-*b* of the memory array 320 during various operations.

As described herein, each of the first portion 325-*a* and the second portion 325-*b* of the memory array 320 may include one or more blocks of memory cells, and each of the memory cells of the memory array 320 may be operated as SLCs or MLCs. That is, each of the memory cells may include a same physical structure but, based on a type of write operation performed by the memory system controller 315, may store a different quantity of bits. For example, a memory cell may store a single bit of data 330 when the memory system controller 315 performs a first type of write operation and may store two or more bits (e.g., multiple bits) of data 330 when the memory system controller 315 performs a second type of write operation.

Whether a certain memory cell (or the memory cells included in a certain portion of the memory array 320) is operated as a SLC or MLC may be a matter of design choice. For exemplary purposes only, the memory cells of the first portion 325-*a* of the memory array 320 may be operated as SLCs and the memory cells of second portion 325-*b* of the memory array 320 may be operated as MLCs. Additionally or alternatively, the first portion 325-*a* of the memory array 320 may be referred to as a SLC cache 325-*a* or a SLC buffer 325-*a* and its size (e.g., the quantity of memory cells or the quantity of blocks of memory cells included in the first portion 325-*a*) may be configurable by the host system 305. For example, the host system 305 may transmit signaling to the memory system 310 indicating which memory cells or blocks (or a quantity of memory cells or blocks) to operate as SLCs. Thus, when memory cells are referred to as SLCs or MLCs, it should be understood to refer to memory cells programmed with an SLC operation or an MLC operation, respectively.

The memory system 310 may operate in different modes (e.g., a first mode, a second mode, etc.) based on signaling received from the host system 305. For example, a first mode or a first mode of operation may refer to a "write booster mode" where data 330 received from the host system 305 is written to SLCs (e.g., to memory cells included in the first portion 325-*a* of the memory array 320). To operate in a write booster mode, the host system 305 may transmit signaling to the memory system 310 to transition the memory system from a second mode of operation (e.g., a "normal" mode of operation) to the first mode of operation. When operating in a write booster mode, the memory system 310 may consume a relatively high amount of power, but its throughput may be increased for one or more write operations. Due to the improved throughput when in write booster mode, the memory system 310 may be able to perform the one or more write operations and transition back to a normal mode of operation (e.g., with reduced power consumption) relatively quickly.

As described herein, whether data 330 is stored to SLCs, MLCs, or both may depend on whether the memory system 310 is operating in write booster mode. In other examples, the memory system controller 315 may determine one or more characteristics of the memory array 320 when writing data 330 to SLCs or MLCs. For example, the memory system controller 315 may monitor a quantity of access operations performed on the first portion 325-*a* of the memory array 320 or a quantity of available memory cells of the first portion 325 of the memory array 320. If one or both of the characteristics (e.g., the quantity of access operations or the quantity of available memory cells) satisfies a threshold then the memory system controller 315 may write data 330 to the SLCs. However, if one or both of the characteristics does not satisfy the threshold, the memory system controller 315 may write data 330 to the MLCs.

In a first example, the memory system 310 may be operating in a first mode (e.g., in a write booster mode) based on signaling received from the host system 305. The host system 305 may transmit a first write command that includes first data 330-*a* and a first indicator to the memory system 310. The first indicator, which may be a flag having a first value (e.g., a high value; a "1") that is included in a received packet, may indicate that the first data 330-*a* is to be pinned to the SLCs (e.g., to the first portion 325-*a* of the memory array 320). That is, the first indicator may restrict the first data to the first portion 325-*a* of the memory array 320. In some examples, the first data 330-*a* may be pinned due to it being frequently accessed by the host system 305. Accordingly, the memory system controller 315 may write the first data 330-*a* to the SLCs and may store the first indicator to a log of the memory system 310.

Additionally or alternatively, the host system 305 may transmit a second write command that includes second data 330-*b*. The second write command may not include an indicator, which may be signaled to the memory system 310 by the flag having a second value (e.g., a low value; a "0") indicated that is included in a received packet, may indicate that the second data 330-*b* is not to be pinned to the SLCs (e.g., to the first portion 325-*a* of the memory array 320). Accordingly, the memory system controller 315 may write the second data 330-*b* to the SLCs. In some examples, subsequent write operations may occur while the memory system 310 is operating in the write booster mode. In such examples, some data 330 may be pinned, while other data 330 may not be pinned. Regardless of whether the data 330 is pinned, the data 330 may be written to the SLCs.

In some examples, one or more maintenance operations (e.g., garbage collection operations, folding operations, etc.) may be performed on the first portion 325-a of the memory array 320. In such operations, unpinned data (e.g., the second data 330-b) may be moved from the SLCs to the MLCs (e.g., to the second portion 325-b of the memory array 320). To move the data 330, the memory system controller 315 may read data 330 from an unpinned block of data 330, write the data 330 to one or more MLCs, and subsequently delete (e.g., erase) the SLC block. That is, a block of data 330 may include both pinned and unpinned data 330, thus the memory system controller 315 may read unpinned data 330 from a block, write the data 330 to one or more MLCs, and erase the SLC block. If the SLC block included pinned data 330, the pinned data 330 may be written (e.g., rewritten) back to the SCL block or written to a different SLC block.

Additionally or alternatively, the memory system controller 315 may reorder the pinned data 330 stored to a block. For example, prior to the maintenance operations being performed, the pinned data 330 may have been non-consecutively ordered in a SLC block. Accordingly, during the maintenance operation, the memory system controller 315 may read the pinned data 330 from the block, write the data 330 to one or more SLCs, and subsequently delete the pinned data from the original SLC block. The memory system controller 315 may also update one or more mapping tables after moving the data 330 (e.g., after moving the data 330 within SLCs or after moving the data 330 from SLCs to MLCs). Such an operation may result in additional SLC blocks being unused, and may also result in the pinned data 330 being located in consecutive SLC blocks.

It may be desirable, in some instances, to unpin data 330 from the SLCs. For example, data 330 may become relatively cold (e.g., less-frequently-accessed) and thus it may be desirable to move the data 330 to the MLCs to free up one or more SLC blocks. To unpin data 330, the host system 305 may transmit a command to unpin certain data 330. The command (e.g., the unpin command) may include an address of the pinned data 330, a length of the data 330 to unpin, or other identifying information. Upon receiving the command, and during a subsequent maintenance operation, the memory system controller 315 may move the unpinned data 330 from the SLCs to the MLCs and may also update one or more mapping tables after moving the data 330. By pinning and unpinning data 330 as described herein, the memory system 310 may improve performance associated with frequently accessed data 330 while maximizing a quantity of available SLCs for subsequent write operations.

In a second example, the memory system 310 may be operating in a first mode (e.g., in a write booster mode) or a second mode of operation (e.g., a "normal" mode). In the second example, the memory system controller 315 may monitor one or more characteristics of the first portion 325-a of the memory array 320. As used herein, a characteristic of the first portion 325-a of the memory array 320 may refer to a quantity of access operations performed over a duration, a quantity of available memory cells or blocks of memory cells, other similar characteristics, or a combination of such characteristics.

When the host system 305 transmits a third write command that includes third data 330-c to the memory system 310, the memory system controller 315 may determine whether the characteristic satisfies a threshold (e.g., a predetermined threshold, which may have been set by the host system 305 or during manufacturing). If the threshold is satisfied, the memory system controller 315 may write the third data 330-c to the SLCs. However, if the threshold is not satisfied, the memory system controller 315 may write the third data $330\_c$ to the MLCs. In other examples, the memory system controller 315 may determine when the characteristic of the first portion 325-a of the memory array 320 satisfies the threshold and transmit signaling to the host system 305 indicating such. Accordingly, in such examples, the host system 305 may selectively transmit data 330 to the memory system 310 based on receiving such signaling, knowing that the data 330 will be written to the SLCs.

Additionally or alternatively, the host system 305 may transmit a fourth command that includes fourth data 330-d and an indication that the fourth data 330-d is temporary data (e.g., data 330 to be used for a relatively short duration). In such instances, the memory system controller 315 may write the fourth data 330-d to the MLCs regardless of the characteristic of the first portion 325-a of the memory array 320, and regardless of whether the memory system 310 is operating in a write booster mode.

In some examples, one or more maintenance operations (e.g., garbage collection operations, folding operations, etc.) may be performed on the first portion 325-a of the memory array 320. In such operations, the third data 330-c may be moved from the SLCs to the MLCs (e.g., to the second portion 325-b of the memory array 320). To move the third data 330-c, the memory system controller 315 may read the blocks of data 330 included in the first portion 325-a, write the data 330 to one or more MLCs, and subsequently delete (e.g., erase) the SLC blocks. Such an operation may result in SLC blocks being freed, which may improve the performance of the memory system during subsequent operations.

Figure 4:
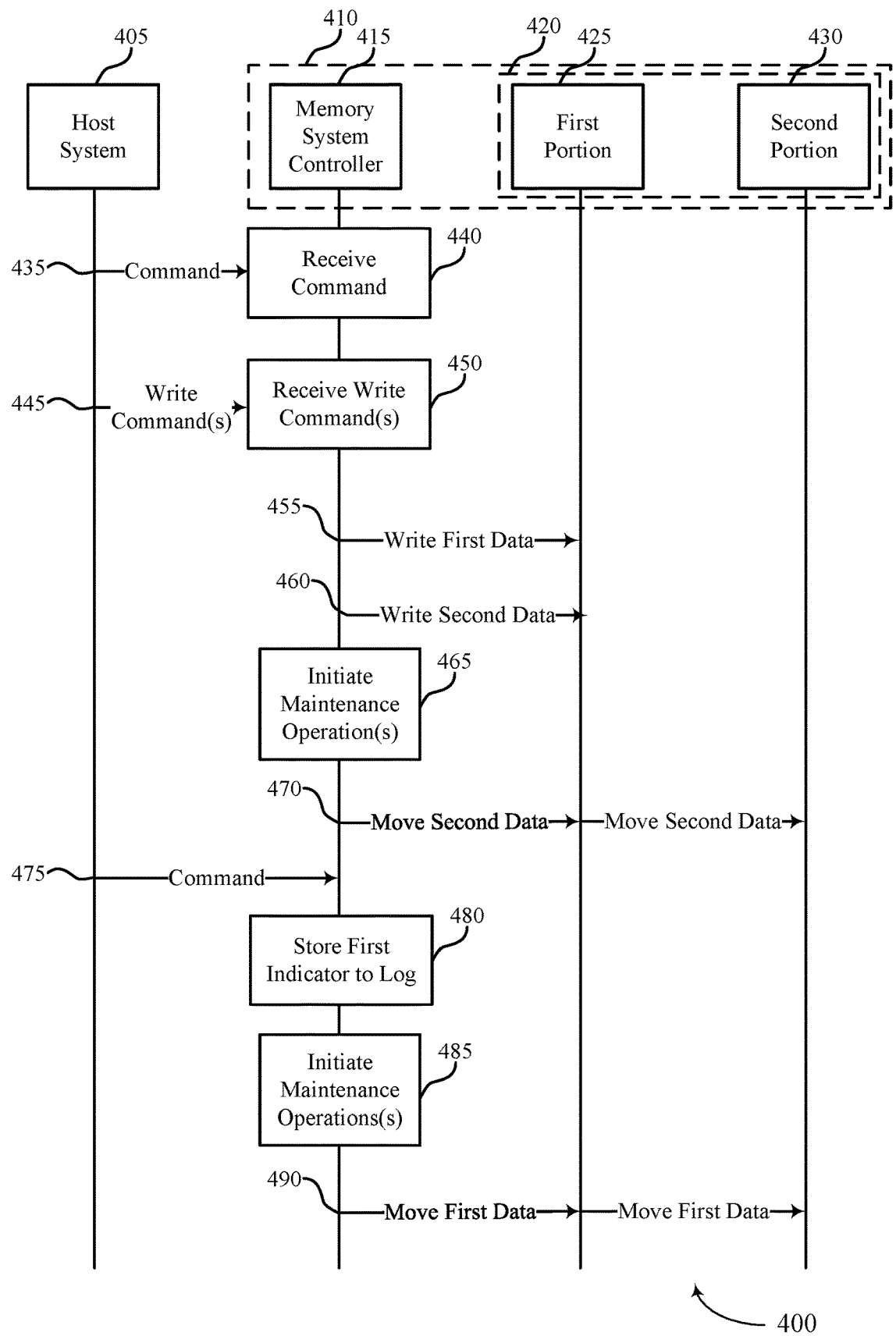
FIG. 4 illustrates an example of a process flow diagram that supports write booster pinning in accordance with examples as disclosed herein.

FIG. 4 illustrates an example of a process flow diagram 400 that supports write booster pinning in accordance with examples as disclosed herein. In some examples, the process flow diagram 400 may illustrate both pinning and unpinning of data to a first portion 425 of a memory array 420 (e.g., to one or more SLCs as described with reference to FIG. 3) of a memory system 410. The memory system 410 may be coupled with a host system 405 and may include a memory system controller 415 and a memory array 420 that includes a first portion 425 and a second portion 430. The process flow diagram 400 may illustrate the memory system 410 operating in a first mode (e.g., a write booster mode) where data is written to one or more SLCs. Additionally or alternatively, some of the data may be pinned such that it is retained in the SLCs after one or more maintenance operations are performed, while other data may be moved from the SLCs to one or more MLCs. By pinning and unpinning data as described herein, the memory system 410 may improve performance associated with frequently accessed data while maximizing a quantity of available SLCs for subsequent write operations.

At 435, the host system 405 may transmit a command to the memory system 410. The command may enable the memory system 410 to transition to a first mode of operation (e.g., into a write booster mode). As described herein, when operating in a write booster mode, the memory system controller 415 may write data received from the host system 405 to memory cells (or blocks of memory cells) included in the first portion 425 of the memory array 420 (e.g., to SLCs) to improve throughput. In some examples, the command transmitted at 435 may be defined by a specification or standard, such as a Universal Flash Storage (UFS) standard.

At 440, the memory system controller may receive the command. Prior to receiving the command, the memory system 410 may have been operating in a different mode of operation, such as a "normal" mode of operation or any mode of operation other than a write booster mode. Although not shown in FIG. 4, upon receiving the command at 440, the memory system 410 may transition to operating in the first mode of operation.

At 445, the host system 405 may transmit one or more write commands to the memory system 410. For example, the host system 405 may transmit at least a first write command that includes first data and a first indicator, and a second write command that includes second data. As described herein, the first indicator may instruct the memory system controller 415 to pin the first data to the SLCs. At 450, the memory system controller 415 may receive the first write command and the second write command. In some examples (not shown), the memory system controller 415 may store the first indicator to a log associated with the memory system 410 (e.g., an L2P table) so that the memory system 410 knows to keep the first data pinned to the SLCs.

At 455, the memory system controller 415 may write the first data to the first portion 425 of the memory array 420 (e.g., to one or more SLCs or one or more SLC blocks). As described herein, the memory system controller 415 may write the first data to the SLCs based on the memory system 410 operating in the write booster mode.

At 460, the memory system controller 415 may write the second data to the first portion 425 of the memory array 420 (e.g., to one or more SLCs or one or more SLC blocks). As described herein, the memory system controller 415 may write the second data to the SLCs based on the memory system 410 operating in the write booster mode. Although the process flow diagram 400 illustrates the first data as being written to the SLCs before the second data, the second data may be written to the SLCs before the first data or the first and second data may be written to the SLCs during an overlapping duration.

At 465, the memory system controller 415 may initiate one or more maintenance operations on at least the first portion 425 of the memory array 420. In some examples, the maintenance operations may be initiated during a duration when the memory system 410 is idle. As described herein, the maintenance operations may entail a garbage collection operation where unpinned data is moved from the SLCs to one or more MLCs. Additionally or alternatively, pinned data may remain in the SLCs after the maintenance operations are performed, however pinned data may be consecutively ordered within one or more SLC blocks. For example, pinned data within one or more blocks of the SLC blocks may be rewritten to one or more different SLC blocks (e.g., during a garbage collection operation).

At 470, the second data may be moved from the first portion 425 of the memory array 420 to the second portion 430 of the memory array 420 based on the second data not being pinned. That is, because the host system 405 did not transmit the second data with an indicator to pin the second data, the second data may be read from the first portion 425 and written to the second portion 430 as part of the one or more maintenance operations. Moreover, upon rewriting all valid data from an SLC block (e.g., pinned valid data to other SLC blocks and unpinned valid data to MLC blocks), the SLC block may be erased such that it can be re-used. Upon moving the data, a mapping table maintained by the memory system 410 may be updated to reflect the new address of the second data. As described herein, data that is not pinned to the SLCs may be less-frequently-accessed (e.g., cold) and thus moving the data to the MLCs may not negatively impact the performance of the memory system 410.

At 475, the host system 405 may transmit a command to the memory system 410. The command may include an indication (e.g., a second indicator) to unpin data (e.g., the first data) from the first portion 425 of the memory array 420. In some instances, the command may include an address of the associated data (e.g., a first LBA to unpin; a block descriptor) and a length of the data to unpin (e.g., in LBAs). For exemplary purposes only, the command transmitted at 475 may instruct the memory system controller 415 to unpin the first data from the SLCs.

At 480, the memory system controller 415 may store the indication of the data to unpin to a log associated with the memory system 410. By storing the second indicator to the log, the memory system controller 415 may be apprised of the data to unpin and move from the SLCs to the MLCs during a subsequent maintenance operation.

At 485, the memory system controller 415 may initiate one or more maintenance operations on at least the first portion 425 of the memory array 420. In some examples, the maintenance operations may be initiated during a duration when the memory system 410 is idle. As described herein, the maintenance operations may entail a garbage collection operation where, for SLC blocks having at least some invalid data, unpinned valid data is written to one or more MLC blocks, and pinned valid data is written to other SLC blocks. Thus, pinned data may remain in the SLCs after the maintenance operations are performed, however the pinned data may be written in contiguous sets of physical addresses within one or more SLC blocks (e.g., based on the garbage collection operation writing pinned valid data to new SLC blocks). The SLC blocks which have had all valid data rewritten to other blocks (e.g., SLC blocks or MLC blocks) may then be erased for reuse.

At 490, as part of the maintenance operations, the first data may be moved from the first portion 425 of the memory array 420 to the second portion 430 of the memory array 420 based on the first data being unpinned by the command (e.g., the command received at 475). That is, because the host system 405 unpinned the first data (e.g., based on the first data becoming cold, or due to other factors), the first data may be read from the first portion 425 and written to the second portion 430 as part of the one or more maintenance operations. Moreover, upon all of the valid data of an SLC block being rewritten to other blocks (e.g., the first data being rewritten to an MLC block), the SLC block may be erased. Upon rewriting the data, a mapping table maintained by the memory system 410 may be updated to reflect the new address of the first data. By pinning and unpinning data as described herein, the memory system 410 may improve performance associated with frequently accessed data while maximizing a quantity of available SLCs for subsequent write operations.

Figure 5:
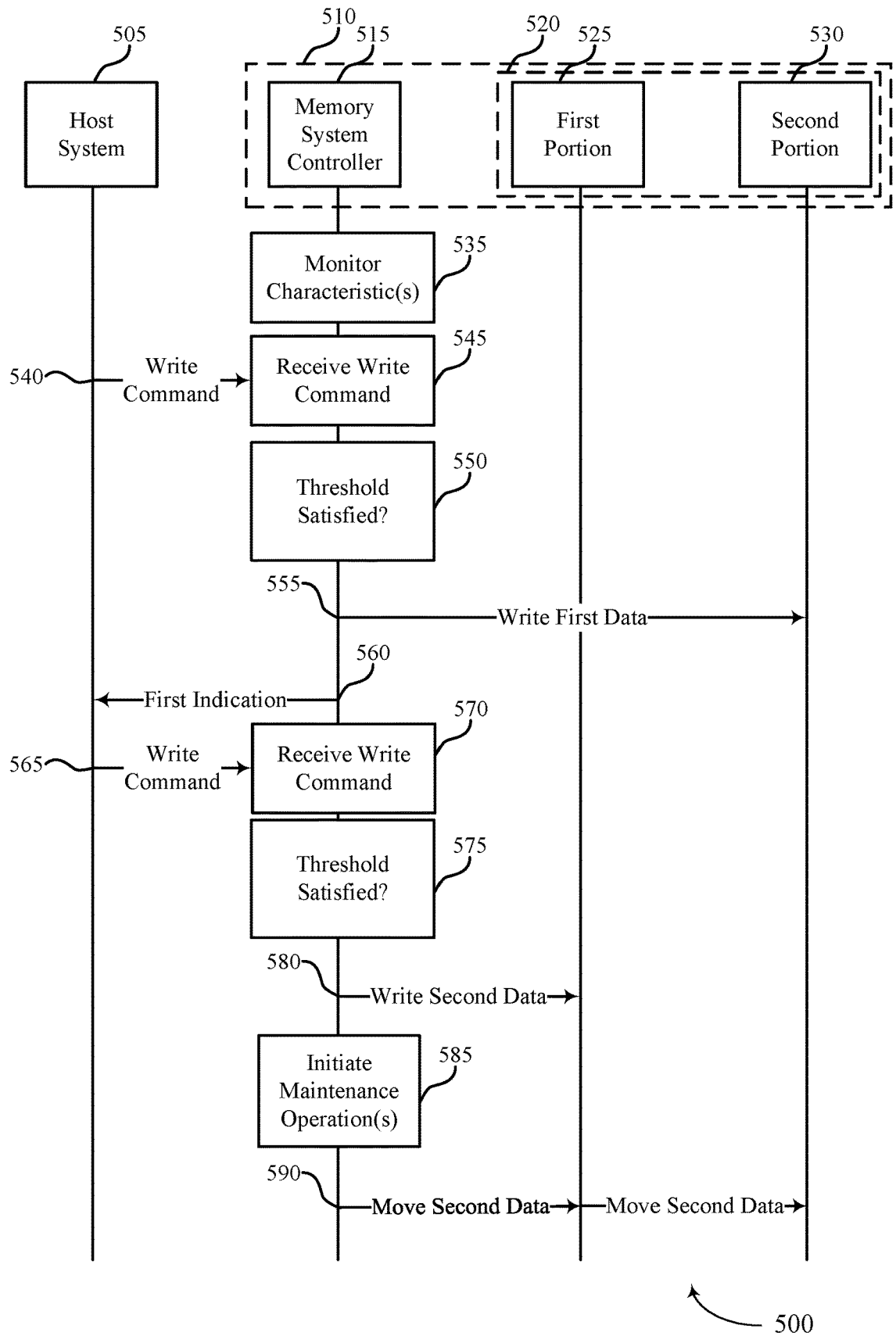
FIG. 5 illustrates an example of a process flow diagram that supports write booster pinning in accordance with examples as disclosed herein.

FIG. 5 illustrates an example of a process flow diagram 500 that supports the management of temporary data in accordance with examples as disclosed herein. In some examples, the process flow diagram 500 may illustrate writing data to a first portion 525 (e.g., to one or more SLCs) or to a second portion 530 (e.g., to one or more MLCs) of a memory array 520 based on one or more characteristics of the memory array 520 or of the received data. The memory system 510 may be coupled with a host system 505 and may include a memory system controller 515 and a memory array 520 that includes a first portion 525 and a second portion 530. The process flow diagram 500 may illustrate the memory system 510 operating in a first mode (e.g., a write booster mode) or a second mode (e.g., a "normal" operation mode) where data is written to SLCs or MLCs based on characteristics of the memory array 520 or of the received data. By writing data to SLCs or MLCs based on respective data, the memory system 510 may improve its performance while maximizing a quantity of available SLCs for subsequent write operations.

At 535, the memory system controller 515 may monitor one or more characteristics associated with the memory array 520. For example, the memory system controller 515 may monitor a quantity of access operations performed on the first portion 525 during a duration, a quantity of available SLCs (or blocks of SLCs) of the first portion 525, a quantity of commands in a queue of the memory system, or a combination of these characteristics. As described herein, the memory system controller 515 may determine whether the monitored characteristic(s) satisfies a threshold and may write received data to one or more SLCs or one or more MLCs based on whether the threshold is satisfied. Additionally or alternatively, the memory system controller 515 may notify the host system 505 of whether the threshold is satisfied (or unsatisfied).

At 540, the host system 505 may transmit one or more write commands to the memory system 510. For example, the host system 505 may transmit at least a first write command that includes first data and a first indicator while the memory system 510 is operating in a first mode (e.g., a write booster mode). As described herein, the first indicator may identify the first data as temporary data. At 545, the memory system controller 515 may receive the first write command.

At 550, the memory system controller 515 may determine whether the threshold associated with the monitored characteristic(s) is satisfied. For example, the memory system controller 515 may monitor a quantity of access operations performed on the SLCs during a duration, and may determine that the quantity of access operations is below a threshold (e.g., that the threshold is satisfied).

At 555, the memory system controller 515 may write the first data to the first portion 525 of the memory array 520 (e.g., to one or more SLCs) based on the threshold being satisfied. In other examples, had the threshold not been satisfied, the memory system controller 515 may have written the first data to the second portion 530 of the memory array 520 (e.g., to one or more MLCs). Additionally or alternatively, in some instances the memory system controller 515 may write the first data to the second portion 530 of the memory array 520 (e.g., to one or more MLCs) independent of the monitored characteristics. That is, when the first data is indicated as being temporary data, the first data may be written to one or more MLCs despite the memory system 510 operating in write booster mode and the threshold being satisfied.

At 560, the memory system controller 515 may transmit a first indication to the host system 505. The first indication may indicate, to the host system 505, that the monitored characteristic(s) satisfies the threshold value. Based on this indication, the host system 505 may transmit data to the memory system 510 that it wants to be written to the first portion 525 (e.g., to one or more SLCs) to improve performance or because the data may be accessed again relatively soon.

At 565, the host system 505 may transmit one or more write commands to the memory system 510. For example, the host system 505 may transmit at least a second write command that includes second data. In some examples, the second write command may be transmitted based on receiving the first indication (e.g., at 560). That is, the host system 505 may transmit the second write command because it knows the second data will be written to one or more SLCs based on the threshold associated with the monitored characteristic(s) being satisfied. At 570, the memory system controller 515 may receive the second write command.

At 575, the memory system controller 515 may determine whether the threshold associated with the monitored characteristic(s) is satisfied. For example, the memory system controller 515 may monitor a quantity of access operations performed on the SLCs during a duration, and may determine that the quantity of access operations is below a threshold (e.g., that the threshold is satisfied).

At 580, the memory system controller 515 may write the second data to the first portion 525 of the memory array 520 (e.g., to one or more SLCs) due to the threshold being satisfied. That is, because the threshold associated with the monitored characteristic(s) is satisfied, the second data may be written to one or more SLCs. In some cases, the second data may be written to the first portion 525 of the memory array 520 when the threshold is satisfied independently of whether the memory system 510 is operating in write booster mode. For example, if the memory system 510 had not been operating in write booster mode, the second data may still have been written to the SLCs based on the threshold being satisfied.

At 585, the memory system controller 515 may initiate one or more maintenance operations on at least the first portion 525 of the memory array 520. In some examples, the maintenance operations may be initiated during a duration when the memory system 510 is idle. As described herein, the maintenance operations may entail a garbage collection operation where data is moved from the SLCs to one or more MLCs.

At 590, the second data may be moved from the first portion 525 of the memory array 520 to the second portion 530 of the memory array 520 as part of the maintenance operation(s). To move the second data, the memory system controller 515 may read the second data from the SLCs, write the data to one or more MLCs, and erase the SLC block. Upon moving the data, a mapping table maintained by the memory system 510 may be updated to reflect the new address of the second data. By writing data to SLCs or MLCs based on respective data, the memory system 510 may improve its performance while maximizing a quantity of available SLCs for subsequent write operations.

Figure 6:
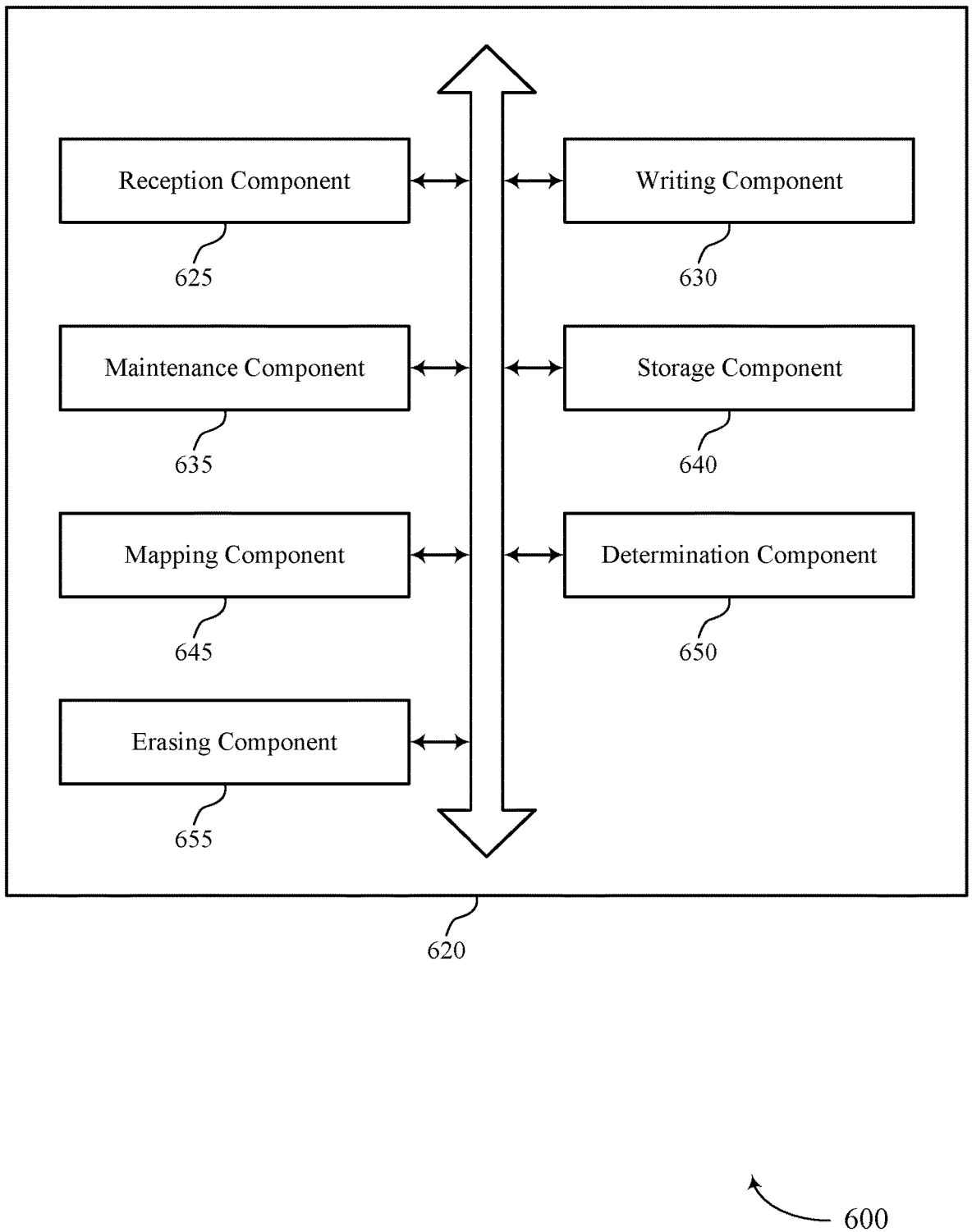
FIG. 6 shows a block diagram of a managed memory system controller that supports write booster pinning in accordance with examples as disclosed herein.

FIG. 6 shows a block diagram 600 of a managed memory system controller 620 that supports write booster pinning in accordance with examples as disclosed herein. The managed memory system controller 620 may be an example of aspects of a managed memory system controller as described with reference to FIGS. 1 through 5. The managed memory system controller 620, or various components thereof, may be an example of means for performing various aspects of write booster pinning as described herein. For example, the managed memory system controller 620 may include a reception component 625, a writing component 630, a maintenance component 635, a storage component 640, a mapping component 645, a determination component 650, an erasing component 655, or any combination thereof. Each of these components may communicate, directly or indirectly, with one another (e.g., via one or more buses).

The reception component 625 may be configured as or otherwise support a means for receiving, at a memory device operating in a first mode associated with a first type of write operation, a first write command including first data and a second write command including second data, the memory device including a memory array having a first portion associated with the first type of write operation and a second portion associated with a second type of write operation. In some examples, the reception component 625 may be configured as or otherwise support a means for receiving, at the memory device, a command including a second indicator to remove the restriction on the first data.

In some examples, the reception component 625 may be configured as or otherwise support a means for receiving, at the memory device, a third write command including third data and a third indicator that the third data includes temporary data. In some examples, the reception component 625 may be configured as or otherwise support a means for receiving, at the memory device, a fourth write command including fourth data and a fourth indicator that the fourth data includes temporary data.

In some examples, the reception component 625 may be configured as or otherwise support a means for receiving, at a memory device including a memory array, a first command for operating the memory device in a first mode associated with a first type of write operation, the memory array including a first portion associated with the first type of write operation and a second portion associated with a second type of write operation. In some examples, the reception component 625 may be configured as or otherwise support a means for receiving, at the memory device operating in the first mode associated with the first type of write operation, a first write command including first data and a first indicator to restrict the first data to the first portion of the memory array and a second write command including second data for writing to the first portion of the memory array using the first type of write operation.

In some examples, the reception component 625 may be configured as or otherwise support a means for receiving, at the memory device, a second command including a second indicator indicating to write the second data to the second portion of the memory array using the second type of write operation during a maintenance operation.

The writing component 630 may be configured as or otherwise support a means for writing the first data associated with the first write command to a first block of memory cells in the first portion using the first type of write operation based at least in part on receiving the first write command, where the first write command includes a first indicator to restrict the first data to the first portion. In some examples, the writing component 630 may be configured as or otherwise support a means for writing the second data associated with the second write command to the first block of memory cells using the first type of write operation based at least in part on receiving the second write command.

In some examples, the writing component 630 may be configured as or otherwise support a means for writing the first data associated with the first write command to a fourth block of memory cells in the first portion of the memory array using the first type of write operation when performing the first set of maintenance operations. In some examples, the writing component 630 may be configured as or otherwise support a means for writing the third data associated with the third write command to a fifth block of memory cells in the second portion of the memory array using the second type of write operation based at least in part on determining that the one or more characteristics of the first portion of the memory array does not satisfy the threshold.

In some examples, the writing component 630 may be configured as or otherwise support a means for writing the fourth data associated with the fourth write command to a sixth block of memory cells in the first portion of the memory array using the first type of write operation based at least in part on determining that the one or more characteristics of the first portion of the memory device satisfies the threshold.

The maintenance component 635 may be configured as or otherwise support a means for performing a first set of maintenance operations on the first block of memory cells, where performing the first set of maintenance operations on the first block of memory cells includes writing the second data to a second block of memory cells in the second portion of the memory array using the second type of write operation while maintaining the first data in the first portion of the memory array. In some examples, the maintenance component 635 may be configured as or otherwise support a means for performing a first set of maintenance operations prior to receiving the second command, where performing the first set of maintenance operations includes writing the second data to the second portion of the memory array using the second type of write operation while maintaining the first data in the first portion of the memory array.

In some examples, the maintenance component 635 may be configured as or otherwise support a means for performing a second set of maintenance operations subsequent to receiving the second command, where performing the second set of maintenance operations includes writing the first data to the second portion of the memory array using the second type of write operation based at least in part on receiving the second command. In some examples, the maintenance component 635 may be configured as or otherwise support a means for performing a second set of maintenance operations on the memory device, where performing the second set of maintenance operations on the memory device includes writing the first data to a third block of memory cells in the second portion of the memory array using the second type of write operation based at least in part on receiving the command.

In some examples, the storage component 640 may be configured as or otherwise support a means for storing the first indicator to a log associated with the memory device based at least in part on receiving the command, where writing the first data to the third block of memory cells using the second type of write operation is based at least in part on storing the first indicator to the log. In some examples, the storage component 640 may be configured as or otherwise support a means for storing the first indicator to a log associated with the memory device based at least in part on receiving the first write command, where maintaining the first data in the first portion of the memory array when performing the first set of maintenance operations is based at least in part on storing the first indicator to the log.

In some examples, the mapping component 645 may be configured as or otherwise support a means for updating a physical address of the second data stored to a mapping table associated with the memory device based at least in part on performing the first set of maintenance operations on the first block of memory cells.

In some examples, the determination component 650 may be configured as or otherwise support a means for determining that one or more characteristics of the first portion of the memory array does not satisfy a threshold based at least in part on receiving the third write command. In some examples, the determination component 650 may be configured as or otherwise support a means for determining that one or more characteristics of the first portion of the memory array does satisfies a threshold based at least in part on receiving the fourth write command.

In some examples, the erasing component 655 may be configured as or otherwise support a means for erasing, when performing the first set of maintenance operations, the first block of memory cells subsequent to writing the second data to the second block of memory cells and writing the first data to the fourth block of memory cells.

Figure 7:
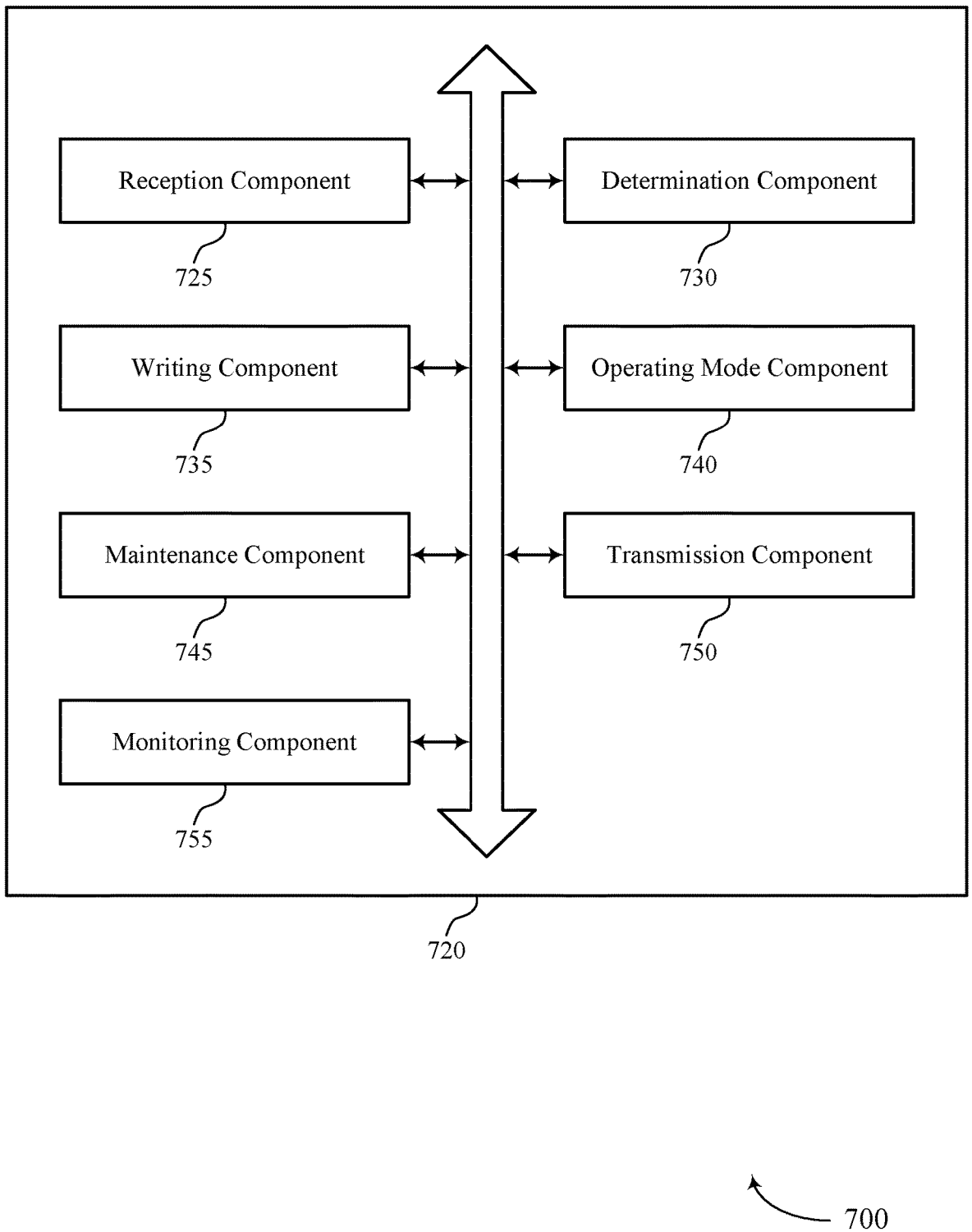
FIG. 7 shows a block diagram of a managed memory system controller that supports write booster pinning in accordance with examples as disclosed herein.

FIG. 7 shows a block diagram 700 of a managed memory system controller 720 that supports write booster pinning in accordance with examples as disclosed herein. The managed memory system controller 720 may be an example of aspects of a managed memory system controller as described with reference to FIGS. 1 through 5. The managed memory system controller 720, or various components thereof, may be an example of means for performing various aspects of write booster pinning as described herein. For example, the managed memory system controller 720 may include a reception component 725, a determination component 730, a writing component 735, an operating mode component 740, a maintenance component 745, a transmission component 750, a monitoring component 755, or any combination thereof. Each of these components may communicate, directly or indirectly, with one another (e.g., via one or more buses).

The reception component 725 may be configured as or otherwise support a means for receiving, at a memory device operating in a first mode associated with a first type of write operation, a write command including first data and an indication that the first data includes temporary data, the memory device including a memory array having a first portion associated with the first type of write operation and a second portion associated with a second type of write operation.

In some examples, the reception component 725 may be configured as or otherwise support a means for receiving, at the memory device, a second write command including second data and an indication that the second data includes temporary data. In some examples, the reception component 725 may be configured as or otherwise support a means for receiving, at the memory device, a command for operating the memory device in the first mode associated with the first type of write operation.

The determination component 730 may be configured as or otherwise support a means for determining whether one or more characteristics of the first portion of the memory array satisfy a threshold based at least in part on receiving the write command. In some examples, the determination component 730 may be configured as or otherwise support a means for determining that the one or more characteristics of the first portion of the memory array satisfies the threshold based at least in part on receiving the second write command.

The writing component 735 may be configured as or otherwise support a means for writing the first data associated with the write command to a first block of memory cells in the second portion of the memory array using the second type of write operation based at least in part on determining that the one or more characteristics of the first portion of the memory array does not satisfy the threshold. In some examples, the writing component 735 may be configured as or otherwise support a means for writing the second data associated with the second write command to a second block of memory cells in the first portion of the memory array using the first type of write operation based at least in part on determining that the one or more characteristics of the first portion of the memory device satisfies the threshold.

In some examples, the operating mode component 740 may be configured as or otherwise support a means for transitioning, by the memory device, from operating in a second mode to the first mode based at least in part on receiving the command.

In some examples, the maintenance component 745 may be configured as or otherwise support a means for performing one or more maintenance operations on the first portion of the memory array, where performing the one or more maintenance operations on the first portion of the memory array includes writing the second data to a third block of memory cells in the second portion of the memory array using the second type of write operation.

In some examples, the transmission component 750 may be configured as or otherwise support a means for transmitting first signaling to a host device indicating the one or more characteristics of the first portion of the memory array satisfies the threshold, where receiving the second write command is based at least in part on transmitting the first signaling to the host device.

In some examples, to support determining that the one or more characteristics of the first portion of the memory array does not satisfy the threshold, the monitoring component 755 may be configured as or otherwise support a means for monitoring, for the duration, the quantity of available memory cells included in the first portion of the memory array. In some examples, to support determining that the one or more characteristics of the first portion of the memory array does not satisfy the threshold, the monitoring component 755 may be configured as or otherwise support a means for monitoring, for the duration, the quantity of access operations performed on the first portion of the memory array.

In some examples, the one or more characteristics of the first portion of the memory device include a quantity of available memory cells, a quantity of access operations performed on the first portion of the memory array over a duration, or a combination thereof.

Figure 8:
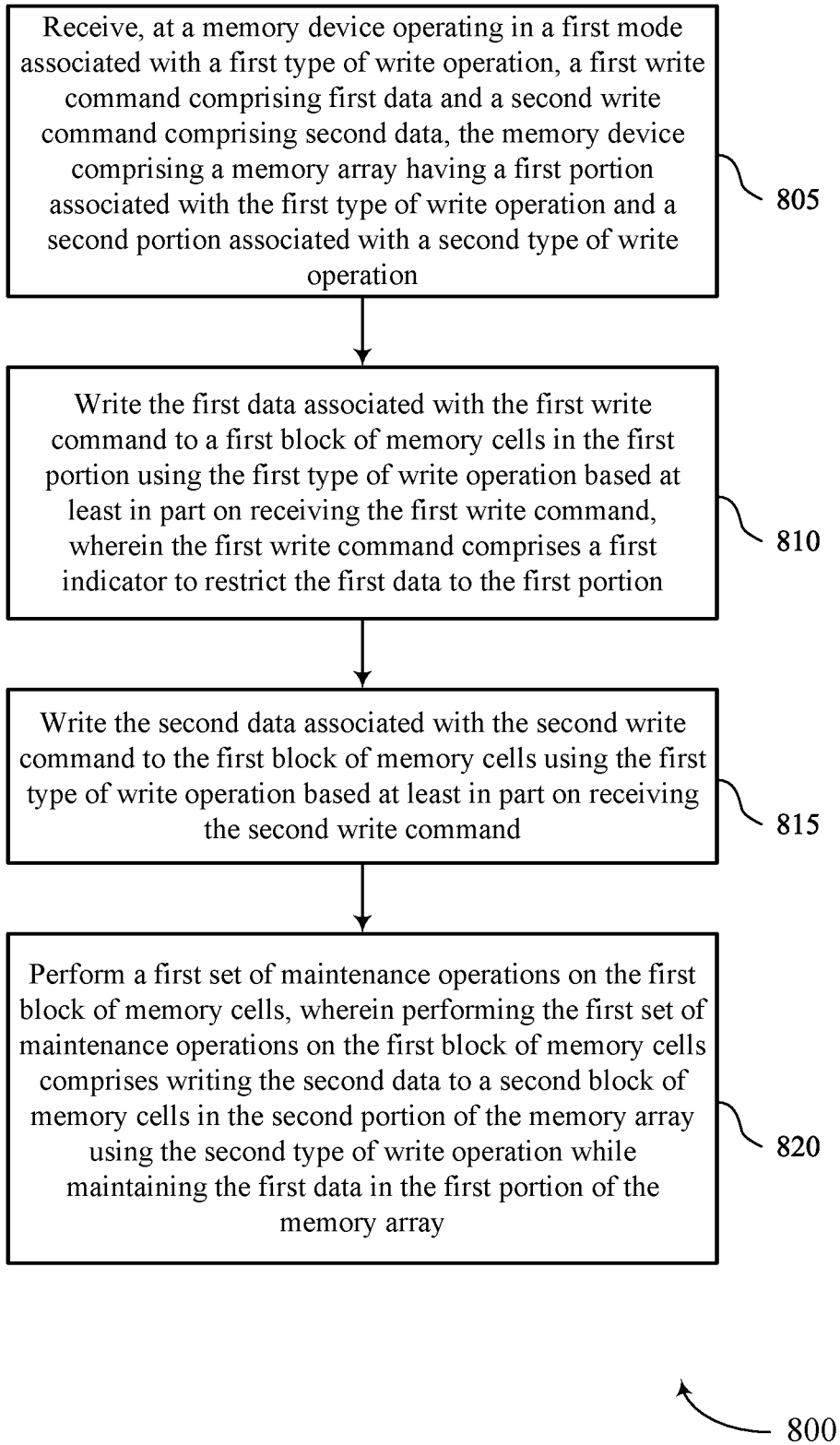
FIGS. 8 through 10 show flowcharts illustrating a method or methods that support write booster pinning in accordance with examples as disclosed herein.

FIG. 8 shows a flowchart illustrating a method 800 that supports write booster pinning in accordance with examples as disclosed herein. The operations of method 800 may be implemented by a managed memory system controller or its components as described herein. For example, the operations of method 800 may be performed by a managed memory system controller as described with reference to FIGS. 1 through 6. In some examples, a managed memory system controller may execute a set of instructions to control the functional elements of the device to perform the described functions. Additionally, or alternatively, the managed memory system controller may perform aspects of the described functions using special-purpose hardware.

At 805, the method may include receiving, at a memory device operating in a first mode associated with a first type of write operation, a first write command including first data and a second write command including second data, the memory device including a memory array having a first portion associated with the first type of write operation and a second portion associated with a second type of write operation. The operations of 805 may be performed in accordance with examples as disclosed herein. In some examples, aspects of the operations of 805 may be performed by a reception component 625 as described with reference to FIG. 6.

At 810, the method may include writing the first data associated with the first write command to a first block of memory cells in the first portion using the first type of write operation based at least in part on receiving the first write command, where the first write command includes a first indicator to restrict the first data to the first portion. The operations of 810 may be performed in accordance with examples as disclosed herein. In some examples, aspects of the operations of 810 may be performed by a writing component 630 as described with reference to FIG. 6.

At 815, the method may include writing the second data associated with the second write command to the first block of memory cells using the first type of write operation based at least in part on receiving the second write command. The operations of 815 may be performed in accordance with examples as disclosed herein. In some examples, aspects of the operations of 815 may be performed by a writing component 630 as described with reference to FIG. 6.

At 820, the method may include performing a first set of maintenance operations on the first block of memory cells, where performing the first set of maintenance operations on the first block of memory cells includes writing the second data to a second block of memory cells in the second portion of the memory array using the second type of write operation while maintaining the first data in the first portion of the memory array. The operations of 820 may be performed in accordance with examples as disclosed herein. In some examples, aspects of the operations of 820 may be performed by a maintenance component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device operating in a first mode associated with a first type of write operation, a first write command including first data and a second write command including second data, the memory device including a memory array having a first portion associated with the first type of write operation and a second portion associated with a second type of write operation; writing the first data associated with the first write command to a first block of memory cells in the first portion using the first type of write operation based at least in part on receiving the first write command, where the first write command includes a first indicator to restrict the first data to the first portion; writing the second data associated with the second write command to the first block of memory cells using the first type of write operation based at least in part on receiving the second write command; and performing a first set of maintenance operations on the first block of memory cells, where performing the first set of maintenance operations on the first block of memory cells includes writing the second data to a second block of memory cells in the second portion of the memory array using the second type of write operation while maintaining the first data in the first portion of the memory array.

Aspect 2: The method, apparatus, or non-transitory computer-readable medium of aspect 1, further including operations, features, circuitry, logic, means, or instructions, or any combination thereof for receiving, at the memory device, a command including a second indicator to remove the restriction on the first data and performing a second set of maintenance operations on the memory device, where performing the second set of maintenance operations on the memory device includes writing the first data to a third block of memory cells in the second portion of the memory array using the second type of write operation based at least in part on receiving the command.

Aspect 3: The method, apparatus, or non-transitory computer-readable medium of aspect 2, further including operations, features, circuitry, logic, means, or instructions, or any combination thereof for storing the first indicator to a log associated with the memory device based at least in part on receiving the command, where writing the first data to the third block of memory cells using the second type of write operation is based at least in part on storing the first indicator to the log.

Aspect 4: The method, apparatus, or non-transitory computer-readable medium of any of aspects 1 through 3, further including operations, features, circuitry, logic, means, or instructions, or any combination thereof for storing the first indicator to a log associated with the memory device based at least in part on receiving the first write command, where maintaining the first data in the first portion of the memory array when performing the first set of maintenance operations is based at least in part on storing the first indicator to the log.

Aspect 5: The method, apparatus, or non-transitory computer-readable medium of any of aspects 1 through 4, further including operations, features, circuitry, logic, means, or instructions, or any combination thereof for writing the first data associated with the first write command to a fourth block of memory cells in the first portion of the memory array using the first type of write operation when performing the first set of maintenance operations.

Aspect 6: The method, apparatus, or non-transitory computer-readable medium of aspect 5, further including operations, features, circuitry, logic, means, or instructions, or any combination thereof for erasing, when performing the first set of maintenance operations, the first block of memory cells subsequent to writing the second data to the second block of memory cells and writing the first data to the fourth block of memory cells.

Aspect 7: The method, apparatus, or non-transitory computer-readable medium of any of aspects 1 through 6, further including operations, features, circuitry, logic, means, or instructions, or any combination thereof for updating a physical address of the second data stored to a mapping table associated with the memory device based at least in part on performing the first set of maintenance operations on the first block of memory cells.

Aspect 8: The method, apparatus, or non-transitory computer-readable medium of any of aspects 1 through 7, further including operations, features, circuitry, logic, means, or instructions, or any combination thereof for receiving, at the memory device, a third write command including third data and a third indicator that the third data includes temporary data; determining that one or more characteristics of the first portion of the memory array does not satisfy a threshold based at least in part on receiving the third write command; and writing the third data associated with the third write command to a fifth block of memory cells in the second portion of the memory array using the second type of write operation based at least in part on determining that the one or more characteristics of the first portion of the memory array does not satisfy the threshold.

Aspect 9: The method, apparatus, or non-transitory computer-readable medium of any of aspects 1 through 8, further including operations, features, circuitry, logic, means, or instructions, or any combination thereof for receiving, at the memory device, a fourth write command including fourth data and a fourth indicator that the fourth data includes temporary data; determining that one or more characteristics of the first portion of the memory array does satisfies a threshold based at least in part on receiving the fourth write command; and writing the fourth data associated with the fourth write command to a sixth block of memory cells in the first portion of the memory array using the first type of write operation based at least in part on determining that the one or more characteristics of the first portion of the memory device satisfies the threshold.

Figure 9:
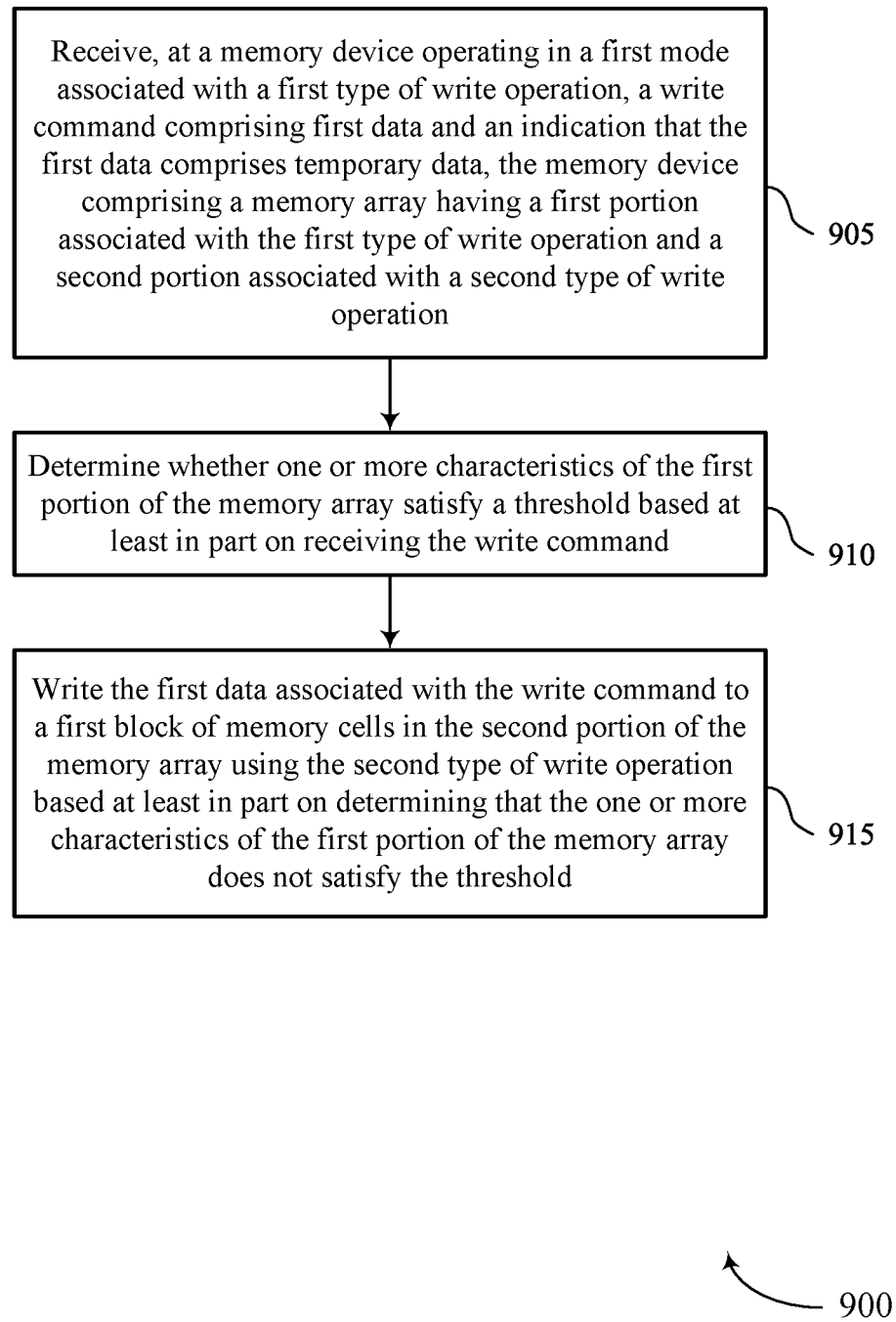

FIG. 9 shows a flowchart illustrating a method 900 that supports write booster pinning in accordance with examples as disclosed herein. The operations of method 900 may be implemented by a managed memory system controller or its components as described herein. For example, the operations of method 900 may be performed by a managed memory system controller as described with reference to FIGS. 1 through 5 and 7. In some examples, a managed memory system controller may execute a set of instructions to control the functional elements of the device to perform the described functions. Additionally, or alternatively, the managed memory system controller may perform aspects of the described functions using special-purpose hardware.

At 905, the method may include receiving, at a memory device operating in a first mode associated with a first type of write operation, a write command including first data and an indication that the first data includes temporary data, the memory device including a memory array having a first portion associated with the first type of write operation and a second portion associated with a second type of write operation. The operations of 905 may be performed in accordance with examples as disclosed herein. In some examples, aspects of the operations of 905 may be performed by a reception component 725 as described with reference to FIG. 7.

At 910, the method may include determining whether one or more characteristics of the first portion of the memory array satisfy a threshold based at least in part on receiving the write command. The operations of 910 may be performed in accordance with examples as disclosed herein. In some examples, aspects of the operations of 910 may be performed by a determination component 730 as described with reference to FIG. 7.

At 915, the method may include writing the first data associated with the write command to a first block of memory cells in the second portion of the memory array using the second type of write operation based at least in part on determining that the one or more characteristics of the first portion of the memory array does not satisfy the threshold. The operations of 915 may be performed in accordance with examples as disclosed herein. In some examples, aspects of the operations of 915 may be performed by a writing component 735 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 10: A method, apparatus, or non-transitory computer-readable medium including operations, features, circuitry, logic, means, or instructions, or any combination thereof for receiving, at a memory device operating in a first mode associated with a first type of write operation, a write command including first data and an indication that the first data includes temporary data, the memory device including a memory array having a first portion associated with the first type of write operation and a second portion associated with a second type of write operation; determining whether one or more characteristics of the first portion of the memory array satisfy a threshold based at least in part on receiving the write command; and writing the first data associated with the write command to a first block of memory cells in the second portion of the memory array using the second type of write operation based at least in part on determining that the one or more characteristics of the first portion of the memory array does not satisfy the threshold.

Aspect 11: The method, apparatus, or non-transitory computer-readable medium of aspect 10, further including operations, features, circuitry, logic, means, or instructions, or any combination thereof for receiving, at the memory device, a second write command including second data and an indication that the second data includes temporary data; determining that the one or more characteristics of the first portion of the memory array satisfies the threshold based at least in part on receiving the second write command; and writing the second data associated with the second write command to a second block of memory cells in the first portion of the memory array using the first type of write operation based at least in part on determining that the one or more characteristics of the first portion of the memory device satisfies the threshold.

Aspect 12: The method, apparatus, or non-transitory computer-readable medium of aspect 11, further including operations, features, circuitry, logic, means, or instructions, or any combination thereof for performing one or more maintenance operations on the first portion of the memory array, where performing the one or more maintenance operations on the first portion of the memory array includes writing the second data to a third block of memory cells in the second portion of the memory array using the second type of write operation.

Aspect 13: The method, apparatus, or non-transitory computer-readable medium of any of aspects 11 through 12, further including operations, features, circuitry, logic, means, or instructions, or any combination thereof for transmitting first signaling to a host device indicating the one or more characteristics of the first portion of the memory array satisfies the threshold, where receiving the second write command is based at least in part on transmitting the first signaling to the host device.

Aspect 14: The method, apparatus, or non-transitory computer-readable medium of any of aspects 10 through 13, further including operations, features, circuitry, logic, means, or instructions, or any combination thereof for receiving, at the memory device, a command for operating the memory device in the first mode associated with the first type of write operation and transitioning, by the memory device, from operating in a second mode to the first mode based at least in part on receiving the command.

Aspect 15: The method, apparatus, or non-transitory computer-readable medium of any of aspects 10 through 14 where the one or more characteristics of the first portion of the memory device include a quantity of available memory cells, a quantity of access operations performed on the first portion of the memory array over a duration, or a combination thereof.

Aspect 16: The method, apparatus, or non-transitory computer-readable medium of aspect 15 where determining that the one or more characteristics of the first portion of the memory array does not satisfy the threshold includes operations, features, circuitry, logic, means, or instructions, or any combination thereof for monitoring, for the duration, the quantity of available memory cells included in the first portion of the memory array and monitoring, for the duration, the quantity of access operations performed on the first portion of the memory array.

Figure 10:
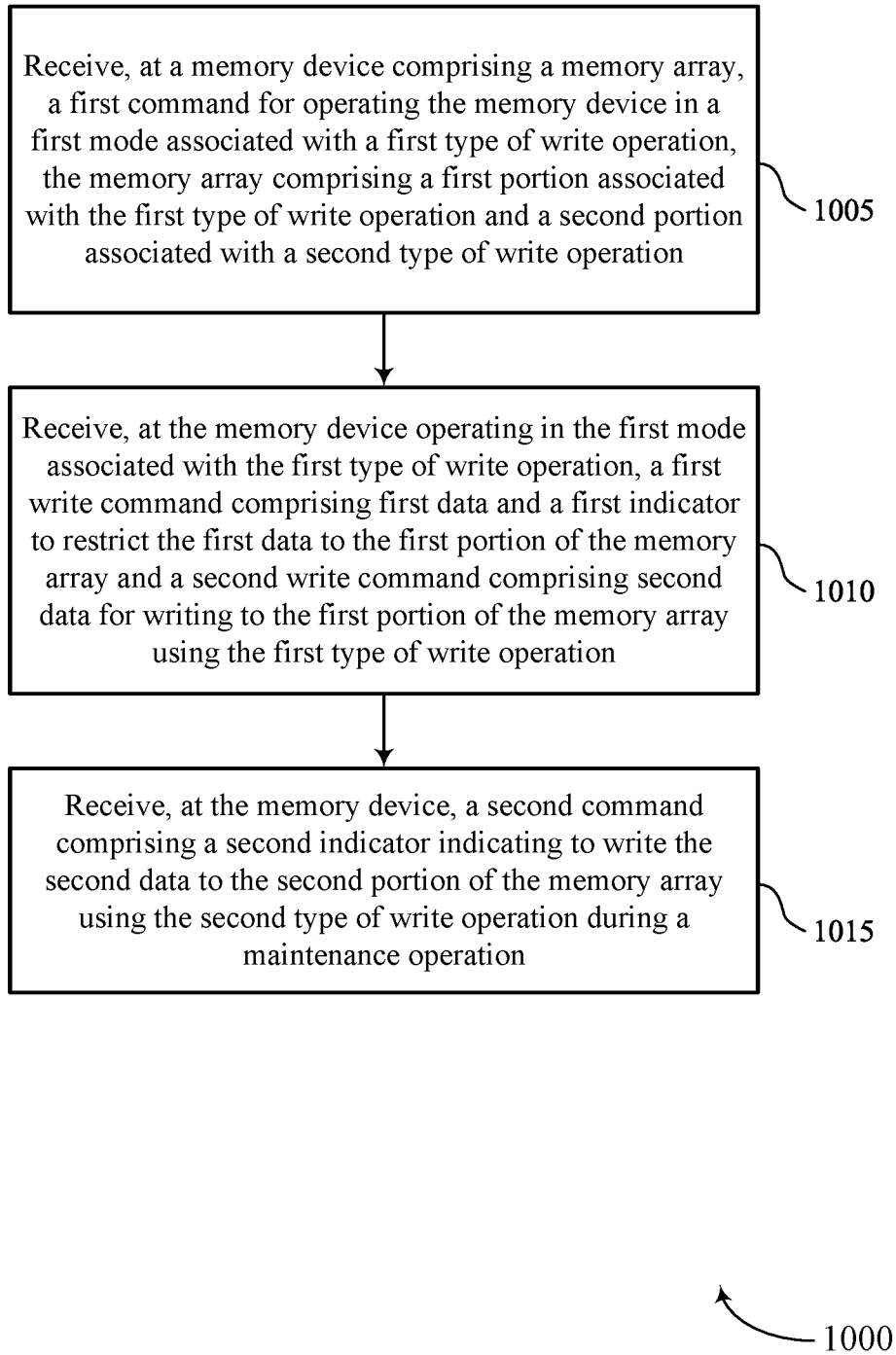

FIG. 10 shows a flowchart illustrating a method 1000 that supports write booster pinning in accordance with examples as disclosed herein. The operations of method 1000 may be implemented by a managed memory system controller or its components as described herein. For example, the operations of method 1000 may be performed by a managed memory system controller as described with reference to FIGS. 1 through 6. In some examples, a managed memory system controller may execute a set of instructions to control the functional elements of the device to perform the described functions. Additionally, or alternatively, the managed memory system controller may perform aspects of the described functions using special-purpose hardware.

At 1005, the method may include receiving, at a memory device including a memory array, a first command for operating the memory device in a first mode associated with a first type of write operation, the memory array including a first portion associated with the first type of write operation and a second portion associated with a second type of write operation. The operations of 1005 may be performed in accordance with examples as disclosed herein. In some examples, aspects of the operations of 1005 may be performed by a reception component 625 as described with reference to FIG. 6.

At 1010, the method may include receiving, at the memory device operating in the first mode associated with the first type of write operation, a first write command including first data and a first indicator to restrict the first data to the first portion of the memory array and a second write command including second data for writing to the first portion of the memory array using the first type of write operation. The operations of 1010 may be performed in accordance with examples as disclosed herein. In some examples, aspects of the operations of 1010 may be performed by a reception component 625 as described with reference to FIG. 6.

At 1015, the method may include receiving, at the memory device, a second command including a second indicator indicating to write the second data to the second portion of the memory array using the second type of write operation during a maintenance operation. The operations of 1015 may be performed in accordance with examples as disclosed herein. In some examples, aspects of the operations of 1015 may be performed by a reception component 625 as described with reference to FIG. 6.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 17: A method, apparatus, or non-transitory computer-readable medium including operations, features, circuitry, logic, means, or instructions, or any combination thereof for receiving, at a memory device including a memory array, a first command for operating the memory device in a first mode associated with a first type of write operation, the memory array including a first portion associated with the first type of write operation and a second portion associated with a second type of write operation; receiving, at the memory device operating in the first mode associated with the first type of write operation, a first write command including first data and a first indicator to restrict the first data to the first portion of the memory array and a second write command including second data for writing to the first portion of the memory array using the first type of write operation; and receiving, at the memory device, a second command including a second indicator indicating to write the second data to the second portion of the memory array using the second type of write operation during a maintenance operation.

Aspect 18: The method, apparatus, or non-transitory computer-readable medium of aspect 17, further including operations, features, circuitry, logic, means, or instructions, or any combination thereof for performing a first set of maintenance operations prior to receiving the second command, where performing the first set of maintenance operations includes writing the second data to the second portion of the memory array using the second type of write operation while maintaining the first data in the first portion of the memory array.

Aspect 19: The method, apparatus, or non-transitory computer-readable medium of aspect 18, further including operations, features, circuitry, logic, means, or instructions, or any combination thereof for performing a second set of maintenance operations subsequent to receiving the second command, where performing the second set of maintenance operations includes writing the first data to the second portion of the memory array using the second type of write operation based at least in part on receiving the second command.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   one or more controllers associated with a memory device, wherein the one or more controllers are configured to cause the apparatus to:
   receive, at the memory device operating in a first mode associated with a first type of write operation, a first write command comprising first data and a second write command comprising second data, the memory device comprising a memory array having a first portion associated with the first type of write operation and a second portion associated with a second type of write operation;
   write the first data associated with the first write command to a first block of memory cells in the first portion using the first type of write operation based at least in part on receiving the first write command, wherein the first write command comprises a first indicator to restrict the first data to the first portion;
   write the second data associated with the second write command to the first block of memory cells in the first portion using the first type of write operation based at least in part on receiving the second write command; and
   perform a first set of maintenance operations on the first block of memory cells, wherein, to perform the first set of maintenance operations on the first block of memory cells, the one or more controllers are configured to cause the apparatus to write the second data to a second block of memory cells in the second portion of the memory array using the second type of write operation while maintaining the first data in the first portion of the memory array.

2. The apparatus of claim 1, wherein the one or more controllers are further configured to cause the apparatus to:
   receive, at the memory device, a command comprising a second indicator to remove the restriction on the first data; and
   perform a second set of maintenance operations on the memory device, wherein, to perform the second set of maintenance operations on the memory device, the one or more controllers are configured to write the first data to a third block of memory cells in the second portion of the memory array using the second type of write operation based at least in part on receiving the command.

3. The apparatus of claim 2, wherein the one or more controllers are further configured to cause the apparatus to:

store the first indicator to a log associated with the memory device based at least in part on receiving the command, wherein the one or more controllers are configured to cause the apparatus to write the first data to the third block of memory cells using the second type of write operation based at least in part on storing the first indicator to the log.

4. The apparatus of claim 1, wherein the one or more controllers are further configured to cause the apparatus to:
store the first indicator to a log associated with the memory device based at least in part on receiving the first write command, wherein the one or more controllers are configured to cause the apparatus to maintain the first data in the first portion of the memory array when performing the first set of maintenance operations based at least in part on storing the first indicator to the log.

5. The apparatus of claim 1, wherein the one or more controllers are further configured to cause the apparatus to:
write the first data associated with the first write command to a fourth block of memory cells in the first portion of the memory array using the first type of write operation when performing the first set of maintenance operations.

6. The apparatus of claim 5, wherein the one or more controllers are further configured to cause the apparatus to:
erase, when performing the first set of maintenance operations, the first block of memory cells subsequent to writing the second data to the second block of memory cells and writing the first data to the fourth block of memory cells.

7. The apparatus of claim 1, wherein the one or more controllers are further configured to cause the apparatus to:
update a physical address of the second data stored to a mapping table associated with the memory device based at least in part on performing the first set of maintenance operations on the first block of memory cells.

8. The apparatus of claim 1, wherein the one or more controllers are further configured to cause the apparatus to:
receive, at the memory device, a third write command comprising third data and a third indicator that the third data comprises temporary data;
determine that one or more characteristics of the first portion of the memory array does not satisfy a threshold based at least in part on receiving the third write command; and
write the third data associated with the third write command to a fifth block of memory cells in the second portion of the memory array using the second type of write operation based at least in part on determining that the one or more characteristics of the first portion of the memory array does not satisfy the threshold.

9. The apparatus of claim 1, wherein the one or more controllers are further configured to cause the apparatus to:
receive, at the memory device, a fourth write command comprising fourth data and a fourth indicator that the fourth data comprises temporary data;
determine that one or more characteristics of the first portion of the memory array does satisfies a threshold based at least in part on receiving the fourth write command; and
write the fourth data associated with the fourth write command to a sixth block of memory cells in the first portion of the memory array using the first type of write operation based at least in part on determining that the one or more characteristics of the first portion of the memory device satisfies the threshold.

10. A non-transitory computer-readable medium storing code, the code comprising instructions executable by processing circuitry to:
receive, at a memory device operating in a first mode associated with a first type of write operation, a first write command comprising first data and a second write command comprising second data, the memory device comprising a memory array having a first portion associated with the first type of write operation and a second portion associated with a second type of write operation;
write the first data associated with the first write command to a first block of memory cells in the first portion using the first type of write operation based at least in part on receiving the first write command, wherein the first write command comprises a first indicator to restrict the first data to the first portion;
write the second data associated with the second write command to the first block of memory cells using the first type of write operation based at least in part on receiving the second write command; and
perform a first set of maintenance operations on the first block of memory cells, wherein the instructions to perform the first set of maintenance operations on the first block of memory cells are executable by the processing circuitry to write the second data to a second block of memory cells in the second portion of the memory array using the second type of write operation while maintaining the first data in the first portion of the memory array.

11. The non-transitory computer-readable medium of claim 10, wherein the instructions are further executable by the processing circuitry to:
receive, at the memory device, a command comprising a second indicator to remove the restriction on the first data; and
perform a second set of maintenance operations on the memory device, wherein the instructions to perform the second set of maintenance operations on the memory device are executable by the processing circuitry to write the first data to a third block of memory cells in the second portion of the memory array using the second type of write operation based at least in part on receiving the command.

12. The non-transitory computer-readable medium of claim 11, wherein the instructions are further executable by the processing circuitry to:
store the first indicator to a log associated with the memory device based at least in part on receiving the command, wherein the instructions to write the first data to the third block of memory cells using the second type of write operation are based at least in part on storing the first indicator to the log.

13. The non-transitory computer-readable medium of claim 10, wherein the instructions are further executable by the processing circuitry to:
store the first indicator to a log associated with the memory device based at least in part on receiving the first write command, wherein the instructions to maintain the first data in the first portion of the memory array when performing the first set of maintenance operations are based at least in part on storing the first indicator to the log.

14. The non-transitory computer-readable medium of claim 10, wherein the instructions are further executable by the processing circuitry to:
- write the first data associated with the first write command to a fourth block of memory cells in the first portion of the memory array using the first type of write operation when performing the first set of maintenance operations.

15. The non-transitory computer-readable medium of claim 14, wherein the instructions are further executable by the processing circuitry to:
- erase, when performing the first set of maintenance operations, the first block of memory cells subsequent to writing the second data to the second block of memory cells and writing the first data to the fourth block of memory cells.

\* \* \* \* \*